UNITED STATES PATENT OFFICE.

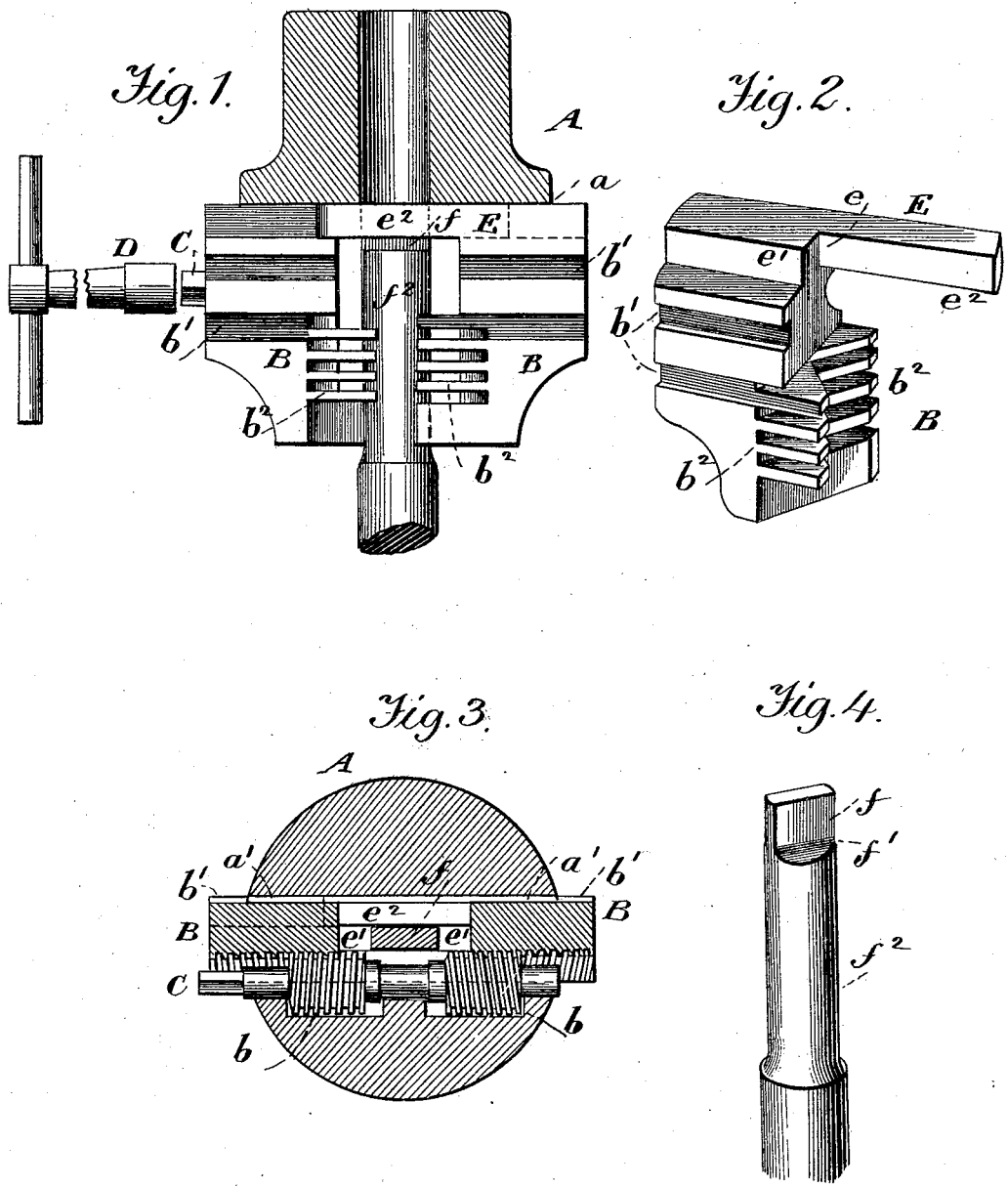

GEORGE W. CROMMIE AND BROADY DUNN, OF CLAYVILLE, NEW YORK.

DRILL-CHUCK.

SPECIFICATION forming part of Letters Patent No. 452,363, dated May 19, 1891.

Application filed March 7, 1891. Serial No. 384,077. (No model.)

*To all whom it may concern:*

Be it known that we, GEORGE W. CROMMIE and BROADY DUNN, citizens of the United States, residing at Clayville, in the county of Oneida and State of New York, have invented certain new and useful Improvements in Drill-Chucks; and we do hereby declare the following to be a full, clear, and exact description of the invention, such as will enable others skilled in the art to which it appertains to make and use the same.

The special object of the invention is to make a chuck of steel or cast-iron which will prevent drills from turning in the jaws thereof and which will hold a flat drill-shank of any size.

The invention consists in an adjustable slide arranged on the top of jaws and movable with them, so that while they grip the circular shank the flat part is held by the slides.

Figure 1 of the drawings is a vertical section of the drill, and Fig. 2 a detail view of one of the jaws with the two grips thereon. Fig. 3 is a horizontal section showing the space between which the flat end of the drill-shank fits, and Fig. 4 a perspective of the drill-shank.

In the drawings, A represents the chuck, which has a diametrical groove $a$, in which the jaws B B are drawn to or from each other by the right-and-left screw C, squared at the outer end to receive the wrench D, by which it is turned. The side walls of the groove $a$ are provided with horizontal guide-tenons $a'$, to fit the side grooves $b'$ of the jaws to make the jaws move in a straight line. On one side of the jaws B B, are the right and left threads $b\ b$, in which work the corresponding threads of the right-and-left screw C. On top of the jaws B B, I make fast the slides E E, which have the corresponding rabbets $e\ e$ and shoulders $e'\ e'$, with the parallel prolongations $e^2\ e^2$, between which fits the flat part $f$ of the drill-shank, and which bear upon the shoulders $f'\ f'$. The flat end $f$ of the drill-shank being thus supported on its two opposite sides the drill cannot possibly turn in the chuck while the jaws are coming together, and when this takes place the teeth $b^2$, which have V-shaped concavities, grip the round part $f^2$ of the drill-shank, while the slide-shoulders $e'\ e'$ grip the ends of the flat part $f$.

What we claim as new, and desire to protect by Letters Patent, is—

In a drill-chuck, the slides E E, having the rabbet $e$, shoulder $e'$, and prolongation $e^2$, in combination with the jaws B B, as and for the purpose set forth.

In testimony whereof we have affixed our signatures in presence of two witnesses.

GEORGE W. CROMMIE.
BROADY DUNN.

Witnesses:
JOHN T. BASTOW,
C. H. MCDOWELL.